Nov. 9, 1948.　　　　D. G. LEWIS　　　　2,453,442
FOLDING CAMERA SUPPORT
Filed Dec. 23, 1946
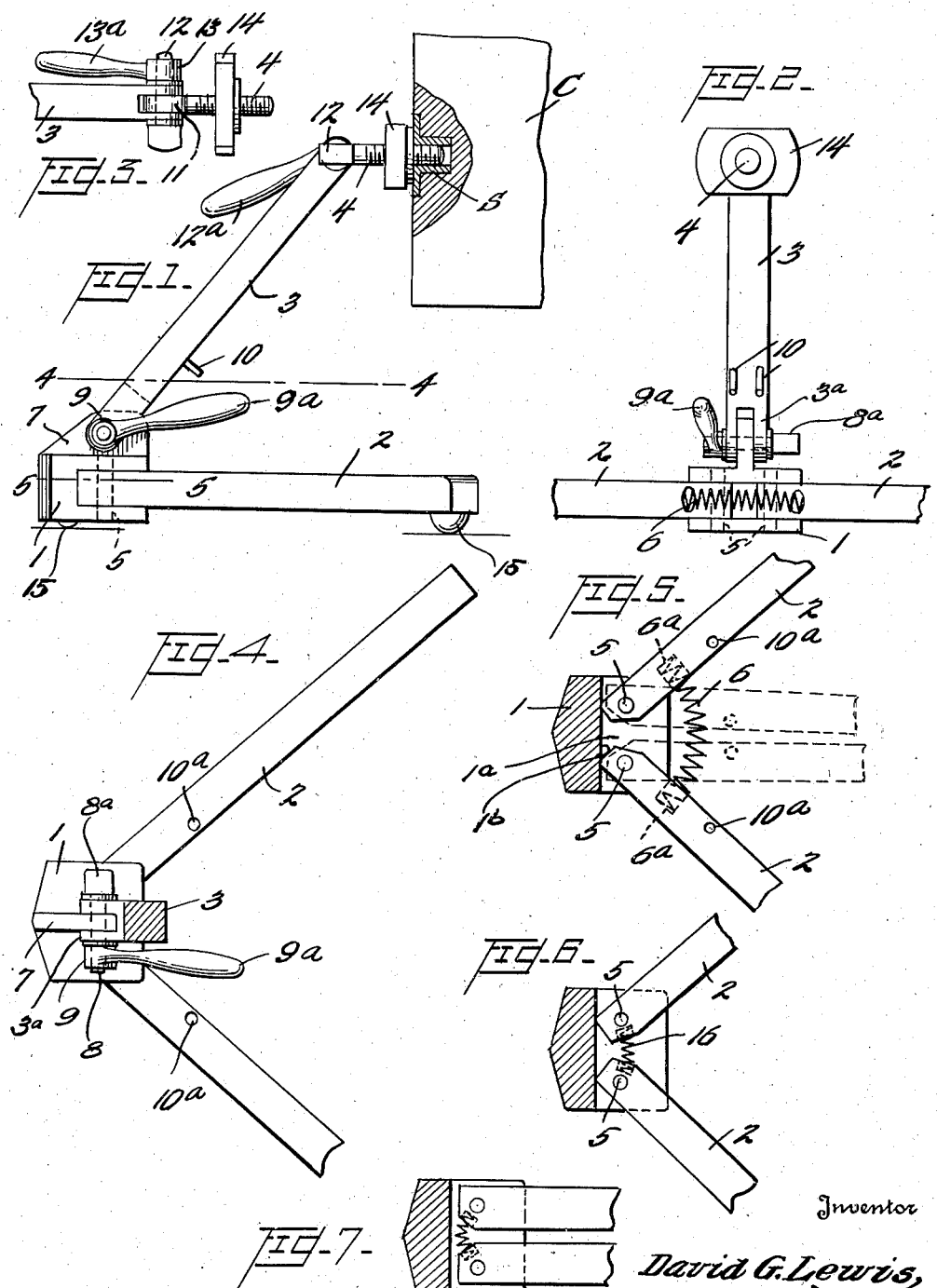
Inventor
David G. Lewis,
By
Attorney Patented Nov. 9, 1948

2,453,442

UNITED STATES PATENT OFFICE 2,453,442

FOLDING CAMERA SUPPORT

David G. Lewis, Sunnyvale, Calif.

Application December 23, 1946, Serial No. 718,084

6 Claims. (Cl. 248—166)

This invention relates to a folding camera support which is capable of being compactly folded together in a manner suitable for carrying in the pocket or in a handbag when not in use, and which is adapted to be quickly and easily set up so as to support a camera at different angles and elevation as occasion requires.

An important object of my invention is to provide a camera support of the above character comprising a pair of ground-engaging feet and a camera-supporting strut both mounted for movement in planes at right-angles to each other from a folded position in which the feet and strut lie in substantial parallel closely spaced relation to set up position in which the feet and strut are angularly spread apart.

Another object of my invention is to provide in a camera support of the above character means for yieldingly maintaining the feet in spread-apart relation when the support is set up for use, said support being so constructed and arranged that, when the parts are folded together the feet are automatically held in collapsed position.

Still another object of my invention is to provide a camera support of the above character comprising an anchor block having a pair of feet pivoted thereto for movement about vertical axes into and out of parallel closely spaced relation, a strut pivoted at its lower end to the anchor block for movement about a horizontal axis into and out of parallel closely spaced relation with the feet and a camera-supporting bracket pivoted to the upper end of the strut for swinging movement about a horizontal axis into and out of alignment with the end of the strut, the construction and arrangement of the camera support being such that by adjusting the strut and the bracket relative to each other about their pivot the elevation and angle of the camera in a vertical plane is likewise adjustable to the desired position for taking a picture.

Other objects and advantages will be apparent from the following detailed description of a preferred embodiment of the invention, reference being had to the annexed drawing in which:

Figure 1 is a side view of a folding camera support showing the manner in which the camera is mounted thereon;

Figure 2 is an end view of the support of Fig. 1;

Figure 3 is a detail view of the camera bracket clamping mechanism;

Figure 4 is a view in transverse cross-section taken on the line 4—4 of Fig. 1;

Figure 5 is a transverse cross-sectional view of the camera support taken on line 5—5 of Fig. 1 showing the spring means for urging the feet apart;

Figure 6 is a transverse cross-sectional view of the camera support showing another form of spring arrangement in the spread-apart position of the feet; and Figure 7 is a cross-sectional view similar to Fig. 6 but showing the feet closed together.

The folding camera support shown in Figs. 1 through 5 of the drawing comprises generally an anchor block 1, a pair of feet 2 pivotally mounted on the anchor block so as to swing in a horizontal plane, a strut 3 pivoted at its lower end to the anchor block for swinging movement in a vertical plane, and a camera-supporting bracket 4 pivotally mounted upon the upper end of the strut for angular adjustment in a vertical plane.

The feet 2 at one end snugly fit within a slot 1a cut within a vertical face of the anchor block 2 and are independently pivoted upon pins 5 vertically secured in the anchor block so as to transect the slot 1a. The feet 2 are of such length as to extend a substantial distance beyond the slot and are movable from closely spaced parallel position, which is their position when the camera support is collapsed, to relatively widely spaced-apart position, which is their position when the camera support is set up for use. For urging the feet to spaced-apart position there is interposed between the feet a coil compression spring 6, the ends of the spring seating within sockets 6a formed in the feet somewhat in advance (i. e. outwardly of the slot) of the pivot pins 5. The ends of the feet adjacent the pivot pins abut the end wall 1b of the slot and serve as stops for limiting the spread of the feet.

Extending along the top of the anchor block is a vertically upstanding rib 7 and the lower end of the strut 3 is bifurcated, as indicated at 3a, so as to straddle this rib. A pin 8 passes through aligned holes in the rib and the bifurcated end of the strut constituting a pivotal mounting for the strut. One end of the pin 8 is headed, as indicated at 8a, while its other end is extended and provided with screw-threads to receive a clamping nut 9 having a handle 9a integrally formed therewith. Thus by turning the handle 9a the bifurcated sides of the strut are drawn into tight frictional engagement with the sides of the rib to hold the strut in the desired position of pivotal adjustment. When the camera support is collapsed the strut 3 will be lowered into close parallel relation to the feet 2 at which time two laterally spaced pegs 10 will fit into sockets 10a in the feet to maintain the feet in parallel relation and prevent the accidental spreading thereof.

The upper end of the strut is bifurcated in a manner similar to its lower end so as to receive the eye portion of an eyebolt 11 which constitutes the camera supporting bracket 4. A headed pin 12 passes through the opening in the eyebolt and through aligned holes in the bifurcated end of the strut to provide a pivotal connection for the bracket. One end of the pin is extended and screw-threaded to receive a clamping nut 13 having a handle portion 13a. By turning the handle 13a the side walls of the bifurcated upper end of the strut may be compressed into binding engagement with the eyebolt to hold the latter in its desired position of pivotal adjustment.

The shank of the eyebolt projects beyond the recess confining the head of the eyebolt and is threaded to screw into a socket S of a camera C. A lock nut 14 is associated with the threaded shank of the eyebolt which nut when the camera is associated with the bracket is turned up tight against the camera to hold the camera rigidly to the bracket after its position has been adjusted. When the camera support is folded together the eyebolt is turned so as to extend in alignment with the end of the strut and thus avoid obstructing the movement of the strut to fully collapsed position.

From the foregoing description it will be apparent that when the camera support is folded together the feet 2 and strut 3 will lie close together in parallel relation so that the support will occupy a minimum amount of space and permit it to be conveniently carried in the pocket or in a handbag. When the support is to be set up, the strut is swung to upright position which, upon withdrawal of the pegs 10 from the sockets 10a, allows the feet to swing apart under the thrust of the compression spring 6. The camera C being associated with the bracket 4, the strut is swung so as to bring the camera to the desired elevation and then clamped in place by the handle 9a. Next the bracket 4 is adjusted and clamped by the handle 13a to fix the position of the camera relative to the perpendicular. In the taking of "angle shots," the pivotal mounting of the bracket 4, as well as the threaded mounting of the camera on the eyebolt 11, allows for a wide scope of angular adjustment relative to both vertical and horizontal planes.

Rubber pads 15 are mounted upon the anchor block 1 and on the outer ends of the feet 2 to provide good frictional engagement with hard surfaces, such as table tops or stone ledges.

In the modified form of the invention shown in Figs. 6 and 7, the pegs 10 and sockets 10a are omitted and a coil spring 16 (corresponding to the spring 6 of the embodiment previously described) is mounted in over-center relation to the pivot pins 5 the arrangement being such that when the feet 2 are spread apart the spring 16 exerts a thrust on the feet in a direction tending to maintain the feet in spaced-apart relation (see Fig. 5) but when the feet are closed together the spring buckles inwardly so as to exert a thrust in the opposite direction to maintain the feet in closed position (Fig. 7).

The anchor block feet and strut are preferably made of aluminum or other light metal to reduce the weight, although they may be made of wood, plastic or other materials if so desired.

The invention is capable of being embodied in other specific forms of camera supports without departing from the spirit or essential attributes thereof; and the embodiments herein described are to be regarded as illustrative and not as restrictive of the invention as defined by the following claims.

I claim:

1. A folding camera support comprising an anchor block, a pair of feet pivotally mounted upon the anchor block for movement in a horizontal plane, a strut pivoted at one end to the anchor block for movement in a vertical plane, said feet and strut being adapted to be swung from parallel closely spaced position to angularly spaced-apart position relative to each other, spring means biasing said feet to spaced-apart position, a camera-supporting bracket pivoted to the other end of said strut for movement in a vertical plane and an interengaging pin-and-socket connection between the strut and feet for preventing pivotal movement of the feet when the support is in folded condition.

2. A folding camera support comprising an anchor block, a pair of feet pivotally and independently mounted upon the anchor block for movement in a horizontal plane, a strut pivoted at one end to the anchor block for movement in a vertical plane, said feet and strut being adapted to be swung from parallel closely spaced position to angularly spaced-apart position relative to each other, a camera-supporting bracket pivoted to the other end of said strut for movement in a vertical plane and a spring interposed between said feet and located in over-center relation to their pivotal connections with the anchor block, said spring exerting pressure to automatically maintain said feet in either their parallel or angularly spaced-apart positions.

3. A folding camera support comprising an anchor block having a slot in a vertical face thereof, a pair of feet having their ends snugly interfitting and pivoted within said slot for movement in a common horizontal plane, a strut pivoted at one end to said anchor block for movement in a vertical plane, said feet and strut being adapted to be swung from parallel closely spaced position to angularly spaced-apart position relative to each other, a camera-supporting bracket pivoted to the other end of said strut for movement in a vertical plane into and out of alignment with the end of said strut and a spring interposed between said feet and located in over-center relation to their pivotal connections with the anchor block, said spring exerting pressure to automatically maintain said feet in either their parallel or angularly spaced-apart positions.

4. A folding camera support comprising an anchor block, a pair of feet pivotally mounted upon the anchor block for movement in a horizontal plane, a strut pivoted at one end to the anchor block for movement in a vertical plane, said feet and strut being adapted to be swung from parallel closely spaced position to angularly spaced-apart position relative to each other and a camera-supporting bracket pivoted to the other end of said strut for movement in a vertical plane, said bracket comprising an eye-bolt having its eye portion received within an open-ended slot in the end of the strut and its threaded shank projecting from said slot for coupling to a camera, a pin extending transversely of the slot and through the eye of the eye-bolt and clamping means mounted upon the pin for compressing the sides of the slot into frictional engagement with the eye portion of the eye-bolt for maintaining the bracket in adjusted position.

5. A folding camera support comprising an anchor block, a pair of feet pivotally mounted upon the anchor block for movement in a horizontal plane, a strut pivoted at one end to the anchor block for movement in a vertical plane, said pivotal mounting for the strut comprising a pin supported in the anchor block and extending transversely of the strut, clamping means upon the pin for frictionally maintaining the strut at different angular positions of adjustment about its pivot, said feet and strut being adapted to be swung from parallel closely spaced position to angularly spaced-apart position relative to each other and a camera-supporting bracket pivoted to the other end of said strut, said bracket comprising an eye-bolt having its eye portion pivotally affixed to the strut and its threaded shank projecting from the strut for coupling to a camera, a pin extending transversely of the strut and through the eye of the eye-bolt and clamping means mounted upon the pin for holding the strut in frictional engagement with the eye portion of the eye-bolt for maintaining the bracket in any adjusted position.

6. A folding camera support comprising an anchor block, a pair of feet pivotally mounted upon the anchor block for movement in a horizontal plane, a strut pivoted at one end to the anchor block for movement in a vertical plane, said pivotal mounting for the strut comprising a pin supported in the anchor block and extending transversely of the strut, clamping means upon the pin for frictionally maintaining the strut at different angular positions of adjustment about its pivot, said feet and strut being adapted to be swung from parallel closely spaced position to angularly spaced-apart position relative to each other and a camera-supporting bracket pivoted to the other end of said strut, said bracket comprising an eye-bolt having its eye portion pivotally affixed to the strut and its threaded shank projecting from the strut for coupling to a camera, means for holding the camera for angular adjustment throughout a range of 360 degrees about the axis of the shank of said eye-bolt, a pin extending transversely of the end of the strut and through the eye of the eye-bolt and clamping means mounted upon the pin for holding the strut in frictional engagement with the eye portion of the eye-bolt for maintaining the bracket in any adjusted position.

DAVID G. LEWIS.

REFERENCES CITED

The following references are of record in the file of this patent:

UNITED STATES PATENTS

| Number | Name | Date |
| --- | --- | --- |
| 639,120 | Webster | Dec. 12, 1899 |
| 856,610 | Steindorf | June 11, 1907 |
| 1,464,279 | Hindley | Aug. 7, 1923 |